United States Patent
Farchi et al.

(10) Patent No.: US 11,334,816 B2
(45) Date of Patent: May 17, 2022

(54) FINDING OPTIMAL SURFACE FOR HIERARCHICAL CLASSIFICATION TASK ON AN ONTOLOGY

(71) Applicant: International Business Machines Corporation, Armonk, NY (US)

(72) Inventors: Eitan D. Farchi, Pardes Hana (IL); Pathirage Perera, San Jose, CA (US); Orna Raz, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 822 days.

(21) Appl. No.: 16/190,826

(22) Filed: Nov. 14, 2018

(65) Prior Publication Data

US 2019/0354899 A1    Nov. 21, 2019

Related U.S. Application Data

(63) Continuation of application No. 15/985,152, filed on May 21, 2018, now Pat. No. 11,281,995.

(51) Int. Cl.
*G06N 99/00*   (2019.01)
*G06N 20/00*   (2019.01)
*G06F 16/22*   (2019.01)

(52) U.S. Cl.
CPC ......... *G06N 20/00* (2019.01); *G06F 16/2246* (2019.01)

(58) Field of Classification Search
CPC .............................. G06N 20/00; G06F 16/2246
(Continued)

(56) References Cited

U.S. PATENT DOCUMENTS 6,233,575 B1    5/2001  Agrawal et al.
8,768,944 B2    7/2014  Yoshii et al.
(Continued)

FOREIGN PATENT DOCUMENTS

WO    WO 2017/147396 A1    8/2017

OTHER PUBLICATIONS

"List of IBM Patents or Patent Applications Treated as Related", Jun. 10, 2019, 2 pages.
(Continued)

*Primary Examiner* — Sibte H Bukhari
(74) *Attorney, Agent, or Firm* — Stephen R. Tkacs; Stephen J. Walder, Jr.; Aaron Pontikos

(57) ABSTRACT

A mechanism is provided in a data processing system having a processor and a memory. The memory comprises instructions which are executed by the processor to cause the processor to implement a training system for finding an optimal surface for hierarchical classification task on an ontology. The training system receives a training data set and a hierarchical ontology data structure. A surface finding component executing within the training system selects a surface that passes through each path from a root to a leaf node in the hierarchical ontology data structure. The surface finding component determines a plurality of adjacent surfaces that differ from the selected component by one node. The surface finding component selects an optimal surface, based on the selected surface and the plurality of adjacent surfaces, that maximizes accuracy and coverage. The training system trains a classifier model for a cognitive system using the optimal surface and the training data set.

20 Claims, 5 Drawing Sheets

(58) Field of Classification Search
USPC .................................... 709/12; 706/12, 102
See application file for complete search history.

(56) References Cited

U.S. PATENT DOCUMENTS

| | | | |
|---|---|---|---|
| 9,367,425 | B1 | 6/2016 | Hale |
| 9,529,836 | B1 | 12/2016 | Hale |
| 9,547,478 | B1 | 1/2017 | Hale |
| 2001/0037324 | A1 | 11/2001 | Agrawal et al. |
| 2008/0091408 | A1* | 4/2008 | Roulland ............... G06F 40/211 704/9 |
| 2012/0004893 | A1 | 1/2012 | Vaidyanathan et al. |
| 2013/0144593 | A1* | 6/2013 | Och ........................ G06F 40/49 704/2 |
| 2014/0343965 | A1 | 11/2014 | Miyoshi et al. |
| 2016/0162456 | A1* | 6/2016 | Munro ................. G06F 40/137 704/9 |
| 2017/0249387 | A1 | 8/2017 | Hatami-Hanza |

OTHER PUBLICATIONS

Anonymously, "Intelligent Ordering of Repeated Fields", IP.com No. IPCOM000252100D, IP.com Electronic Publication Date: Dec. 15, 2017, 35 pages.

Anonymously, "Machine-Learning for Optimization of Software Parameters", IP.com No. IPCOM000252023D, IP.com Electronic Publication Date: Dec. 13, 2017, 35 pages.

Anonymously, "Semi-Supervised Classification Using Object Metadata", IP.com No. IPCOM000252345D, IP.com Electronic Publication Date: Jan. 5, 2018, 34 pages.

Hernandez, Julio et al., "Multidimensional Hierarchical Classification", Expert Systems with Applications vol. 41, Issue 17, Dec. 1, 2014, 7 pages.

Perera, Sujan et al., "Optimizing Hierarchical Classification with Adaptive Node Collapses", The Workshops of the Thirty-Second AAAI Conference on Artificial Intelligence, Feb. 2-7, 2018, 4 pages.

Verma, Nakul et al., "Learning Hierarchical Similarity Metrics", 2012 IEEE Conference on Computer Vision and Pattern Recognition, Jun. 16-21, 2012, 8 pages.

List of IBM Patents or Patent Applications Treated as Related, Nov. 14, 2018, 2 pages.

Maji, Pradipta, "Efficient design of neural network tree using a new splitting criterion", Neurocomputing, vol. 71, No. 4, Jan. 1, 2008, pp. 787-800.

Wang, Xiao-Lin et al., "A Meta-Top-Down Method for Large-Scale Hierarchical Classification", IEEE Transactions on Knowledge and Data Engineering, vol. 26, No. 3, Mar. 2014, pp. 500-513.

\* cited by examiner

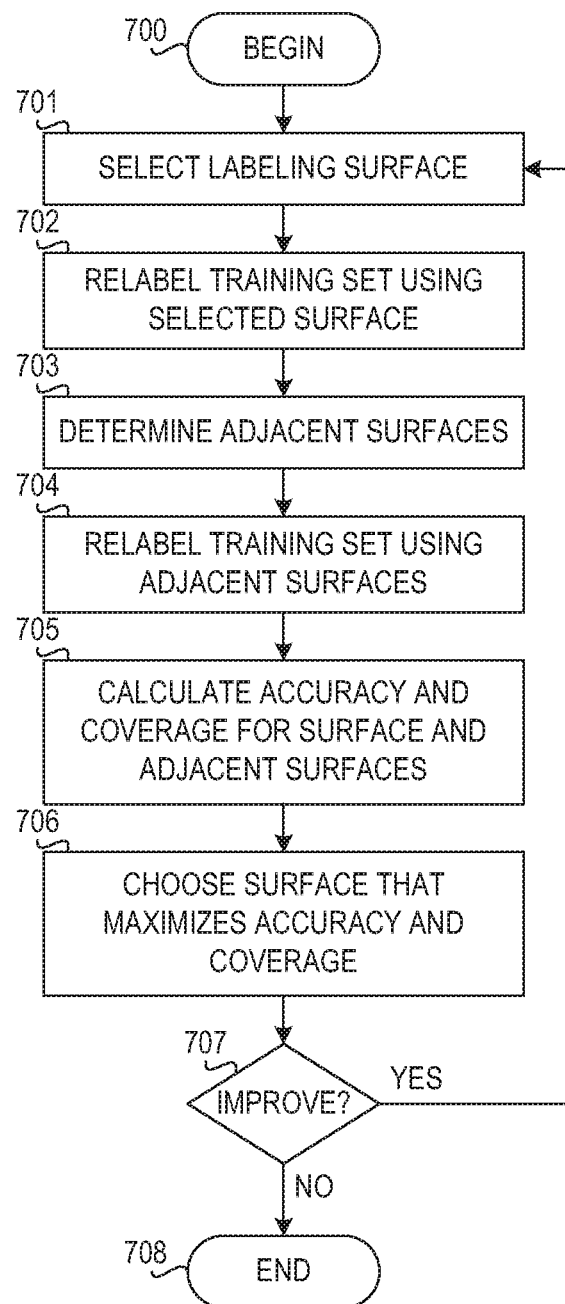

FINDING OPTIMAL SURFACE FOR HIERARCHICAL CLASSIFICATION TASK ON AN ONTOLOGY

BACKGROUND

The present application relates generally to an improved data processing apparatus and method and more specifically to mechanisms for finding optimal surface for hierarchical classification task on an ontology.

Data intensive solutions, such as solutions that include machine learning components, are becoming more and more prevalent. The standard way of developing such solutions is to train machine learning models with manually annotated or labeled data for a given task. This methodology assumes the existence of ample human annotated data.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system having a processor and a memory. The memory comprises instructions which are executed by the processor to cause the processor to implement a training system for finding an optimal surface for hierarchical classification task on an ontology. The method comprises receiving, by the training system, a training data set and a hierarchical ontology data structure. The method further comprises selecting, by a surface finding component executing within the training system, a surface that passes through each path from a root to a leaf node in the hierarchical ontology data structure. The method further comprises determining, by the surface finding component, a plurality of adjacent surfaces that differ from the selected component by one node. The method further comprises selecting, by the surface finding component, an optimal surface, based on the selected surface and the plurality of adjacent surfaces, that maximizes accuracy and coverage. The method further comprises training, by the training system, a classifier model for a cognitive system using the optimal surface and the training data set.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 7 is a flowchart illustrating operation of a mechanism for finding the optimal surface for hierarchical classification on an ontology in accordance with an illustrative embodiment.

DETAILED DESCRIPTION

Figure 1:
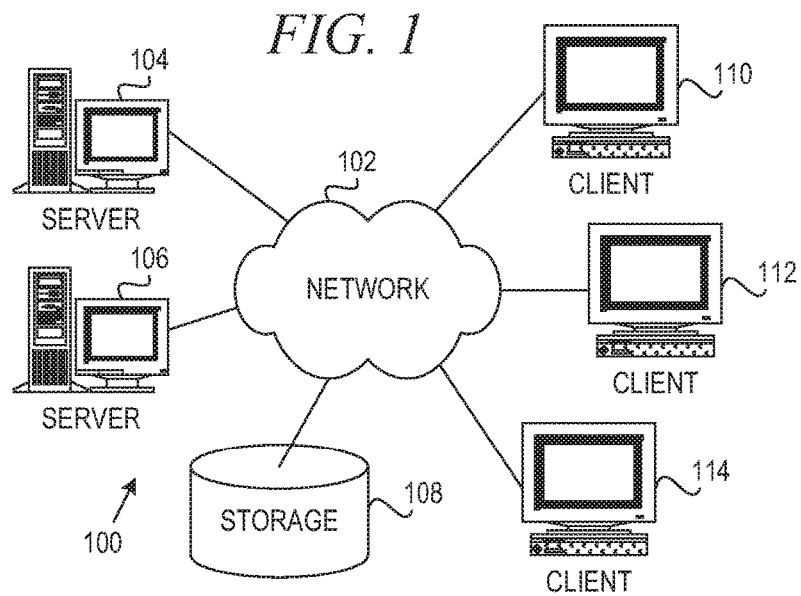
FIG. 1 is an example diagram of a distributed data processing system in which aspects of the illustrative embodiments may be implemented.

Data intensive solutions rely on data and on machine learning models that generalize from this data. In many of the real-world problems, the quantity and the quality of the data challenge the machine learning algorithms. In particular, the large-scale hierarchical classification problems are challenged by the data distribution and complexity of the hierarchy. This is prevalent in the medical domain where hierarchical classification tasks like coding the medical conditions to International Classification of Disease (ICD) hierarchy, coding adverse events to Medical Dictionary for Regulatory Activities (MedDRA) hierarchy and coding drug and compounds to World Health Organization Drug Dictionary (WHODD) hierarchy are essential for various purposes like diagnosing, billing, monitoring drug safety, secondary analysis tasks and regulatory processes. The main challenges in solving these problems include:

Long tail distributions, making it infeasible to learn all the data classes (labels), because there is insufficient training data for classes appearing in the long tail.

Hierarchy of labels. There is a trade-off between the level of label details (there are more details lower in the hierarchy) and the amount of training data available (there is less data lower in the hierarchy).

Often, the goal is to learn the most specific concept, i.e., cover the lowest level hierarchy classes. Of course, the requirement is to do so with sufficiently high accuracy.

Given these challenges, it is important to understand the limitations of the machine learning models with respect to the quality and quantity of the available dataset. In a hierarchical classification problem, it may not be possible to train a classifier that always classifies instances to a leaf node. For example, if a particular leaf node has only a few training examples or the existing examples are significantly diverse in terms of their semantics, the classification algorithm may find it difficult to learn to classify to this node. In such cases, it may make sense to train a classifier that is capable of classifying to the parent of that node. The goal of the illustrative embodiments is to find a surface in the hierarchy that maximizes a combination of: (1) the classification accuracy; and, (2) coverage of leaf nodes in the hierarchy.

The illustrative embodiments provide a mechanism for determining a combination of nodes over which to train a cognitive system from an ontology or a labeling hierarchy. The illustrative embodiments balance accuracy with class coverage by taking into account the fact that some classes in the labeling hierarchy of the training data set do not have enough training data or contain particularly difficult semantics while other classes have great semantic diversity among the training data, e.g., the training dataset has a long tail distribution. The mechanism of the illustrative embodiments, given a set of training data for a classification task, finds a surface in the labeling hierarchy, or line, that maximizes the accuracy of predictions and the coverage of specific classes in the hierarchy.

Prior art solutions determine which classes can or cannot be used to train a cognitive system. The prior art solutions select the classes that can be trained and ignore other classes. In contrast, the mechanism of the illustrative embodiments does not ignore the classes. The mechanism of the illustrative embodiments determines the abstractness level, expressed as a surface or line in the hierarchy, that can be used to train the classification model or algorithm.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
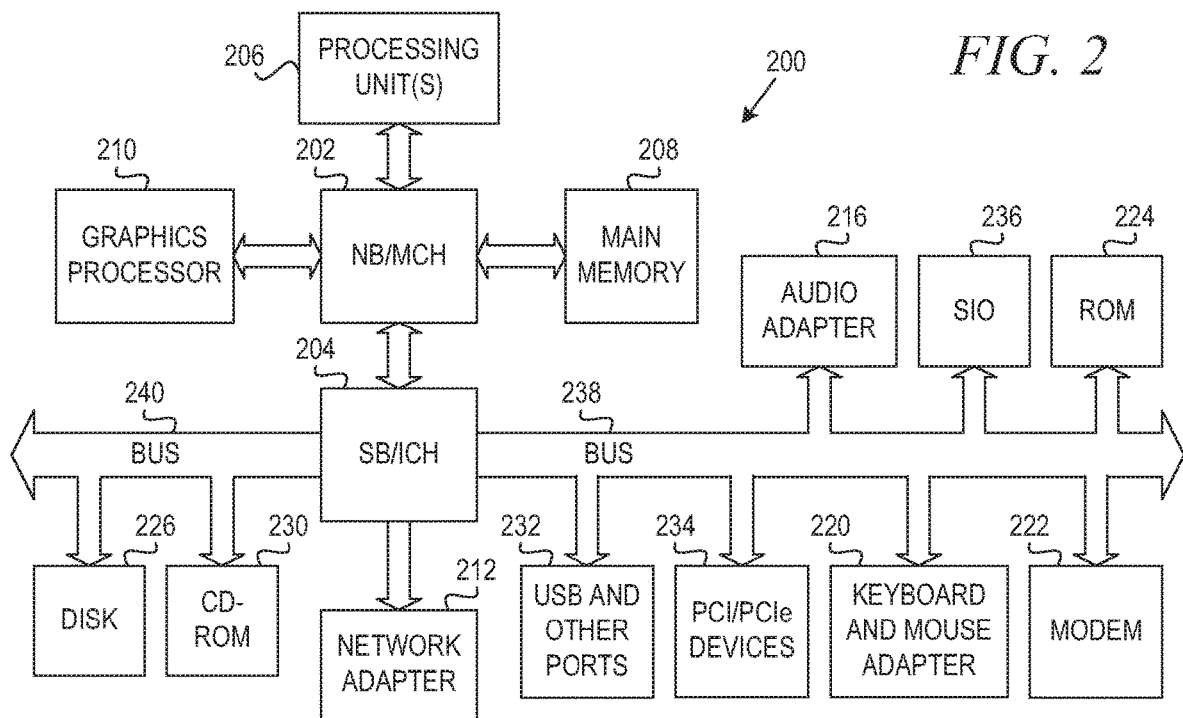
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a classifier training system with a surface finding component that finds the optimal surface for a hierarchical classification on an ontology. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates finding an optimal surface for a hierarchical classification on an ontology.

As noted above, the mechanisms of the illustrative embodiments utilize specifically configured computing devices, or data processing systems, to perform the operations for an optimal surface finding component. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the classifier training system with a surface finding component that finds the optimal surface for a hierarchical classification on an ontology.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
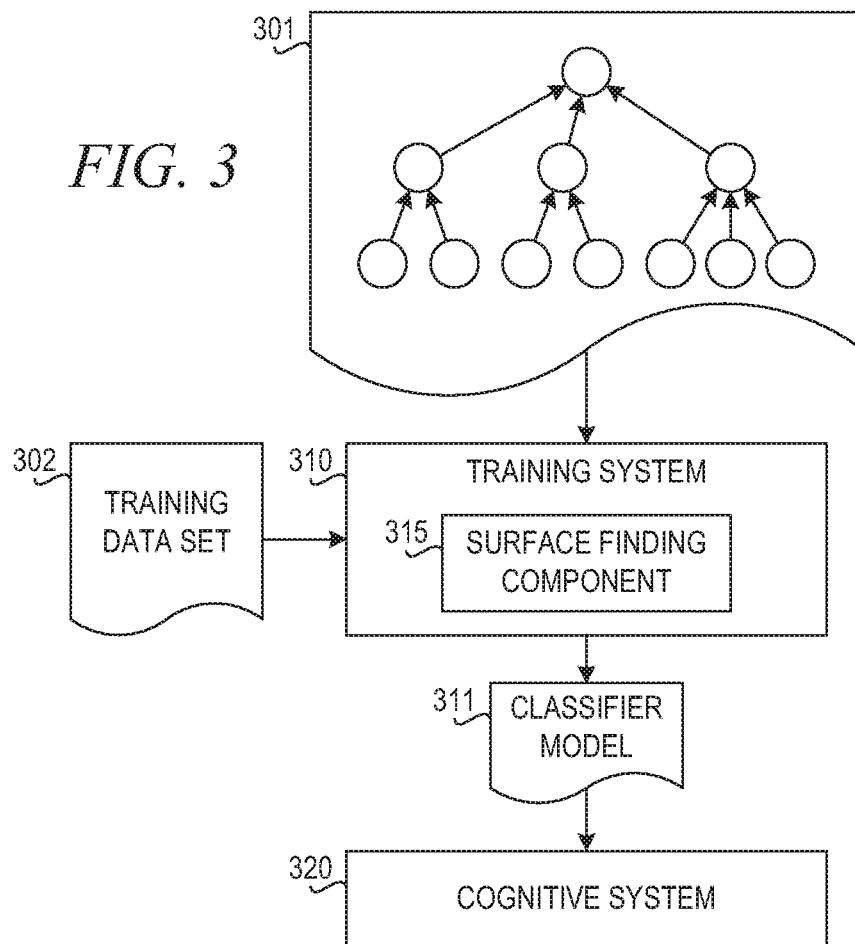
FIG. 3 is a block diagram of a training system including a surface finding component for finding an optimal surface for a hierarchical classification task on an ontology in accordance with an illustrative embodiment.

FIG. 3 is a block diagram of a training system including a surface finding component for finding an optimal surface for a hierarchical classification task on an ontology in accordance with an illustrative embodiment. Training system 310 receives a training data set 302 for training a classifier model 311 on an ontology or labeling hierarchy 301 for cognitive system 320. Under control of classifier model 311, cognitive system 320 classifies data into classes in ontology 301. Cognitive system 320 may perform a cognitive operation, such as natural language processing, question answering, decision support, etc. In one example, cognitive system 320 may perform a hierarchical classification task to classify training data based on an ontology in the medical domain.

Training system 310 includes surface finding component 310 for finding the optimal surface for hierarchical classification tasks on ontology 301. For example, a classification task may seek to classify an adverse event (AE) to a particular medical code; however, the training data 302 may have some codes that have a large amount of training data and others that do not have very much training data. A long tail distribution is a training data set in which there are many training instances for some classes, but the number of training instances decreases rapidly and there are much fewer training instances for a majority of the classes in the ontology. Therefore, the classifier model 311 can be trained with greater specificity for the classes with the most training instances in training data set 302, but the classifier model 311 can be trained at a higher level for the classes with fewer training instances. When training the classifier model 311 for cognitive system 320, given a long tail distribution, the problem is how to get a good training data set to train the cognitive system to perform an accurate classification while including as many leaf nodes in the hierarchy as possible. Clients using the cognitive system 320 for classification want a cognitive system that is trained on as many leaf nodes as possible as they represent more specific classification results, but there may be insufficient training data for accurately classifying into these classes. Thus, inclusion of leaf nodes tends to reduce accuracy.

The illustrative embodiments define a surface over a hierarchy to be a set of hierarchy tree nodes that intersect once each path from the root of the hierarchy (highest level node) to the leaves of the hierarchy (lowest level nodes). FIGS. 4A-4D illustrate the trade-off between accuracy and leaf node coverage in accordance with an illustrative embodiment. The hierarchy 400 has three levels. The ideal scenario would be that the training data set contains sufficient data with high quality to train a classifier that can classify new instances to one of the seven leaf nodes. However, when the training data does not satisfy the above requirement, it is important to decompose the problem and solve sub-problems.

The goal of the illustrative embodiments is to find the segment of the hierarchy 400 where the training system can train the model to classify at leaf node level and the segment where the training system has to restrict the classification problem to higher level in the hierarchy 400. This segmentation is indicated with a line drawn on the hierarchy referred to herein as the "surface." However, the training system should keep a balance when drawing the surface on the hierarchy. As shown in the FIG. 4A, as the surface 51 is moved up, the classifier model can potentially get a higher accuracy but may lose the specificity of the classification results. Hence, it is important to cover as many leaf nodes as possible while attaining the desired accuracy level.

Figure 4A:
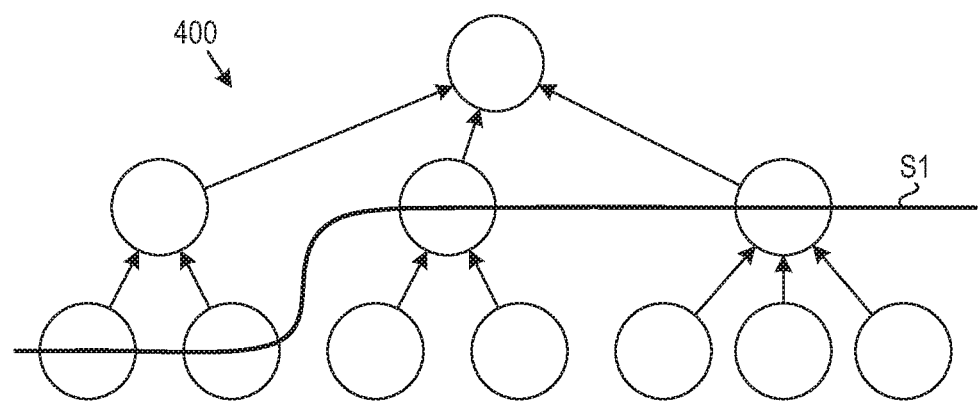
FIGS. 4A-4D illustrate the trade-off between accuracy and leaf node coverage in accordance with an illustrative embodiment.
Figure 4B:
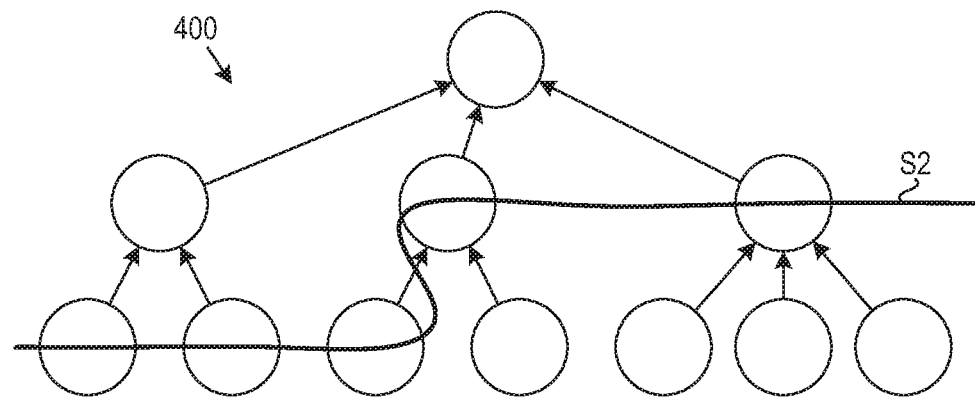
Figure 4C:
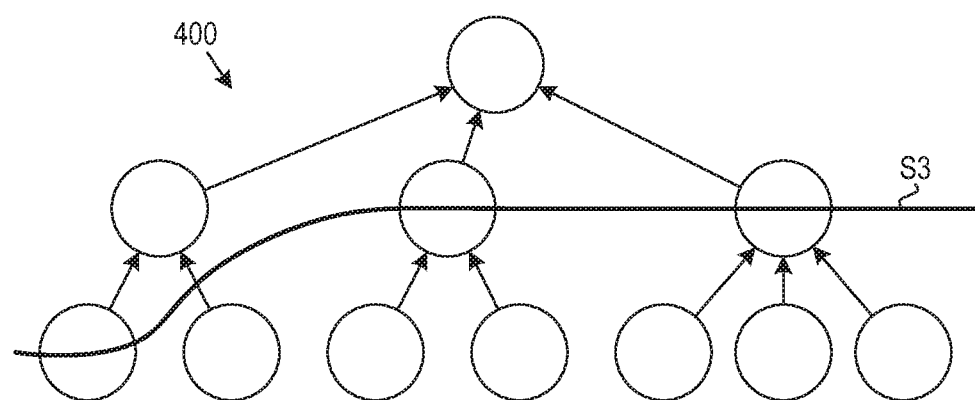
Figure 4D:
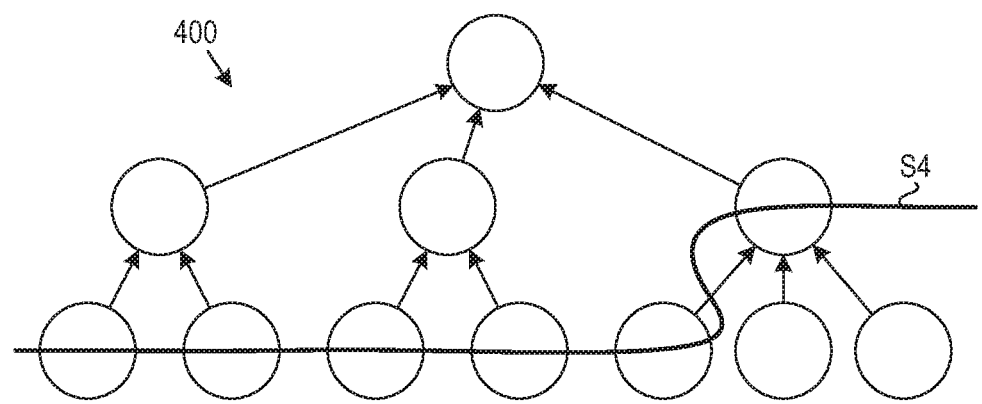

As seen in FIG. 4A, the number of leaf nodes through which surface 51 passes is two. Turning to FIG. 4B, the number of leaf nodes through which surface S2 passes is three; however, note that surface S2 passes through each class or each path from the root to a given leaf With reference now to FIG. 4C, surface S3 passes through each class of hierarchy 400 but only passes through one leaf node. In FIG. 4D, surface S4 passes through five leaf nodes. Thus, surface S3 in FIG. 4C may achieve more accurate results with less specific classification for most classes, but surface S4 may cover more leaf nodes for more specific results but may sacrifice accuracy.

The defined optimization problem balances the need for accuracy and the coverage of leaf nodes. The mechanism starts with a surface and calculates the accuracy and the number of leaf nodes covered, and optimizes over these characteristics. The task of classifying to the leaves that are not included in the surface should be handled separately. A possible approach is to implement a non-learning solution for these leaf classes (e.g., a dictionary). Another possible approach is to implement a learning solution, where there is only a need to classify the nodes under the chosen surface node. For those leaf nodes of the hierarchy not included in the surface, the mechanism determines the correct parent class for the data instance. This allows the training system to train a separate classifier for leaf nodes under this parent to determine their leaf node. Note that this classifier is easier to train relative to the large classifier and would have less impact from the long-tailed data distribution due to a significantly smaller number of classes.

In one embodiment, a user may specify a number of leaf nodes to be included in the training data set and the accuracy desired for the classification operation. From these inputs, it is possible to determine the surface that provides the desired number of leaf nodes and accuracy for use in selecting training data. The method optimizes the accuracy plus the highest number of nodes. Additional optimization goals may be added, such as a requirement for high diversity in the content (e.g., textual description) of the leaf nodes.

The illustrative embodiments provide a mechanism for determining a combination of nodes over which to train a machine learning model from an ontology or a labeling hierarchy. Any proposed algorithm must balance learning accuracy with leaf nodes coverage. Various considerations exist. For example, some classes in the labeling hierarchy of the training data set do not have enough training data or contain particularly difficult semantics while instances of another class have homogeneous semantic in the training data. In this case, it might make sense to draw the surface covering the latter class and the parent of the former class.

The illustrative embodiments define the following search problem. Given a set of training data for a classification task, the goal is to find a surface in the labeling hierarchy that maximizes the accuracy of predictions and the coverage of specific classes in the hierarchy.

Figure 5:
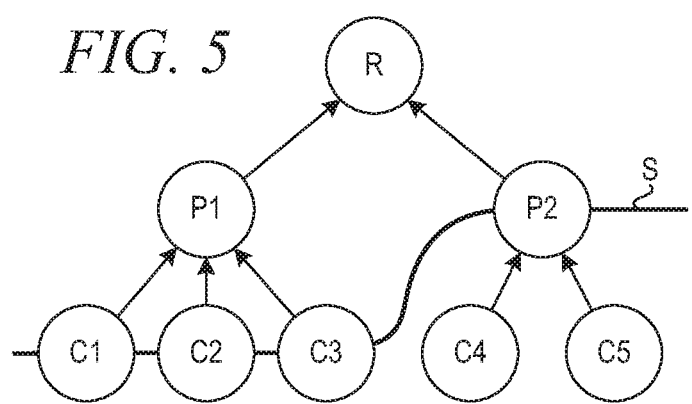
FIG. 5 depicts a three level labeling tree in accordance with an illustrative embodiment.

The mechanism is given a training set $(X_1, Y_1), \ldots (X_n, Y_n)$. The mechanism is also given a labeling hierarchy T. Each $Y_i$ corresponds to a path in T from root to leaf A labeling surface, s, is a set of tree nodes that intersect each path from the root to the leaf once. For example, FIG. 5 depicts a three level labeling tree in accordance with an illustrative embodiment:

T={(R, P1), (R, P2), (P1, C1), (P1, C2), (P1, C3), (P2, C4), (P2, C5)} s=(C1, C2, C3, P2)

Where T is a label tree and s is a possible surface as depicted by the line over the tree nodes.

Given a labeling surface s, the mechanism relabels the training set using the surface s as follows. The new label of $X_1$ is defined as the intersection between the surface s and $Y_{i,Y_i^{si}} = s \cap Y_i$. The learning problem associated with surface s is $L_s$. The mechanism applies some learning algorithm to $L_s$ and gets an accuracy value $f(L_s)$. The mechanism trains on the re-labelled training data according to the selected surface and evaluates the resulting cognitive model with a testing dataset. The mechanism compares the accuracy value generated for each surface. For a given surface s, an adjacent surface s' is a surface that differs from s by only one node. The set of all such adjacent surfaces of s is denoted as adj(s).

Given a surface s the mechanism defines its weight to be the sum of depth of all its nodes, denoted by w(s). For example, in the depicted example the weight is w(s)=2+2+2+1. Now the following discrete gradient decent greedy search algorithm is defined. Set m to be a weighted hyper parameter of the algorithm.

1. Choose some surface s.
2. Calculate $C(s)=f(L_S)+m*w(s)$ for s and any s∈adj (s). Pick s that maximizes C(s), where C(s) quantifies a balance between accuracy and leaf node coverage.
3. Repeat until C(s) does not improve by t, where t is a predefined threshold value.

Figure 6:
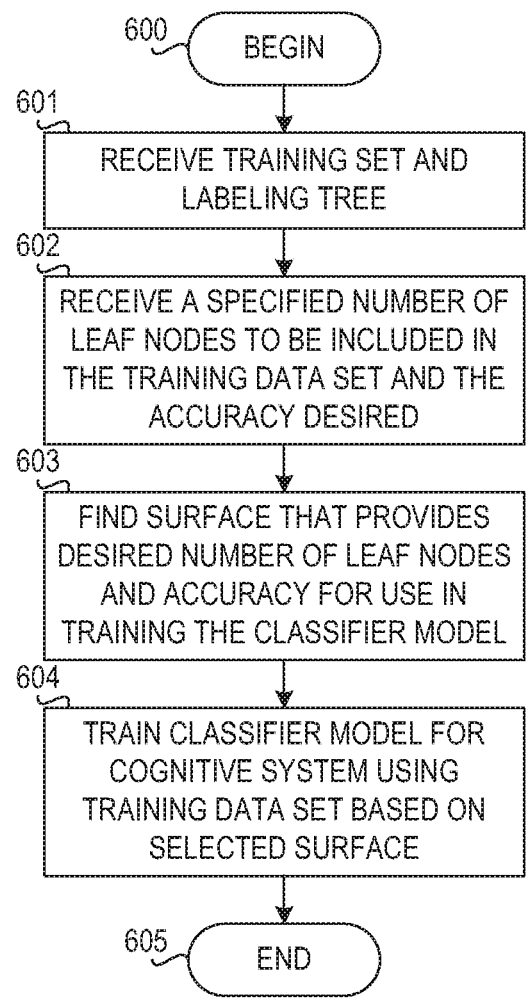
FIG. 6 is a flowchart illustrating operation of a training system for finding optimal surface for hierarchical classification on an ontology in accordance with an illustrative embodiment.

FIG. 6 is a flowchart illustrating operation of a training system for finding optimal surface for hierarchical classification on an ontology in accordance with an illustrative embodiment. Operation begins (block 600), and the training system receives a training data set and a hierarchical labeling tree (block 601). The training system receives a specified number of leaf nodes to be included in the training data set and the accuracy desired (block 602). A surface finding component within the training system finds a surface that provides the desired number of leaf nodes and accuracy for use in training the classifier model (block 603). Operation for finding the optimal surface for hierarchical classification on an ontology is described in further detail below with reference to FIG. 7. Then, the training system trains the classifier model for the cognitive system using the training data set based on the selected surface (block 604). Thereafter, operation ends (block 605). The training system may determine whether the optimal surface found in block 603 covers the desired number of leaf nodes and achieves the desired accuracy.

The training dataset is re-labeled according to the selected surface. Then any classification algorithm is selected and this training data is used to train a model, i.e., the training example (x,y), where x is the input and y is the correct label for x, is given to the classifier and it is trained to minimize the difference between the predicted label for x and y. In this step, classifier specific operations, such as feature selection, feature normalization, hyperparameter selection tuning, may be performed.

FIG. 7 is a flowchart illustrating operation of a mechanism for finding the optimal surface for hierarchical classification on an ontology in accordance with an illustrative embodiment. Operation begins (block 700), and the mechanism selects a labeling surface (block 701). In one embodiment, this initial surface may be chosen randomly. In another embodiment, the initial surface may be chosen by selecting a line through a predetermined level of the hierarchy. For example, for a three-level hierarchy, such as the examples in FIGS. 4A-4D and FIG. 5, the initial surface may pass through each path at the second level. In another example embodiment, the initial surface may be chosen to include the number of leaf nodes specified in block 602 in FIG. 6.

The mechanism then relabels the training set using the selected surface (block 702). The formal description is of relabeling the training set is above. Intuitively, what it does is take the training example (x,y), if the y is a node that is included in the selected surface, then the mechanism does nothing; otherwise, the mechanism checks the parent of y that is included in the surface, assume that is yp, then the mechanism relabels the training instance to (x, yp). The mechanism then determines adjacent surfaces (block 703). Each adjacent surface differs from the selected surface by one node. The mechanism relabels the training set using each of the adjacent surfaces (block 704). The mechanism then calculates the accuracy and coverage for the surface and adjacent surfaces (block 705). The mechanism chooses the surface that maximizes accuracy and coverage (block 706).

The mechanism then determines whether the accuracy and coverage of the chosen surface improves significantly for an adjacent surface compared to the current surface (block 707). If the accuracy and coverage improve, then the adjacent surface is chosen, and operation returns to block 701 to determine a next surface. In other words, the mechanism calculates the C(s) for each adjacent surface at 705. If the difference between C(s) of any adjacent surface and C(s) of the selected surface at block 701 is greater than t, a predetermined threshold, then the mechanism selects that adjacent surface and starts again from block 701. Operation repeats until accuracy and coverage do not improve in block 707, in which case operation ends (block 708).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system having a processor and a memory, wherein the memory comprises instructions which are executed by the processor to cause the processor to implement a training system for finding an optimal surface for hierarchical classification task on an ontology, the method comprising:
    receiving, by the training system, a training data set and a hierarchical ontology data structure;
    receiving, by the training system, a user-specified number of leaf nodes to be covered and a user-specified desired accuracy;
    identifying, by a surface finding component executing within the training system, a plurality of surfaces that pass through each path from a root to a leaf node in the hierarchical ontology data structure;
    selecting, by the surface finding component, an optimal surface within the plurality of surfaces that covers the user-specified number of leaf nodes and achieves the user-specified desired accuracy;
    re-labelling, by the training system, the training data set using the optimal surface to form a re-labelled training data set; and
    training, by the training system, a classifier model for a cognitive system on the re-labelled training data set using the optimal surface and the training data set.

2. The method of claim 1, wherein selecting the optimal surface comprises:
    selecting an initial surface that passes through each path from a root to a leaf node in the hierarchical ontology data structure;
    determining a plurality of adjacent surfaces within the plurality of surfaces that differ from the selected initial surface by one node;
    determining a combined coverage and accuracy value for the selected initial surface and for each of the plurality of adjacent surfaces; and
    determining whether a combined coverage and accuracy value of a given adjacent surface is greater than the combined coverage and accuracy value of the selected initial surface by a predetermined threshold.

3. The method of claim 2, wherein selecting the optimal surface further comprises:
    responsive to determining the combined coverage and accuracy value of the given adjacent surface is greater than the combined coverage and accuracy value of the selected initial surface by the predetermined threshold, selecting the given adjacent surface as a current selected surface and repeating determining a plurality of adjacent surfaces that differ from the current selected surface by one node and selecting the optimal surface, based on the current selected surface and the plurality of adjacent surfaces, that maximizes accuracy and coverage.

4. The method of claim 2, wherein selecting the optimal surface further comprises:
    responsive to determining that there is no given adjacent surface having a combined coverage and accuracy value that is greater than the combined coverage and accuracy value of the selected initial surface, identifying the selected initial surface as the optimal surface.

5. The method of claim 1, wherein the cognitive system classifies data into classes in the hierarchical ontology data structure under control of the classifier model.

6. The method of claim 1, wherein training the classifier comprises evaluating a resulting cognitive model with a testing dataset.

7. A computer program product comprising a non-transitory computer readable storage medium having a computer readable program stored therein, wherein the computer readable program, when executed on at least one processor of a computing device, causes the at least one processor to implement a training system for finding an optimal surface for hierarchical classification task on an ontology, wherein the computer readable program causes the at least one processor to:

receive, by the training system, a training data set and a hierarchical ontology data structure;

receiving, by the training system, a user-specified number of leaf nodes to be covered and a user-specified desired accuracy;

identify, by a surface finding component executing within the training system, a plurality of surfaces that pass through each path from a root to a leaf node in the hierarchical ontology data structure;

select, by the surface finding component, an optimal surface within the plurality of surfaces, that covers the user-specified number of leaf nodes and achieves the user-specified desired accuracy;

re-label, by the training system, the training data set using the optimal surface to form a re-labelled training data set; and train, by the training system, a classifier model for a cognitive system on re-labelled training data using the optimal surface and the training data set.

8. The computer program product of claim 7, wherein selecting the optimal surface comprises:

selecting an initial surface that passes through each path from a root to a leaf node in the hierarchical ontology data structure;

determining a plurality of adjacent surfaces within the plurality of surfaces that differ from the selected initial surface by one node;

determining a combined coverage and accuracy value for the selected initial surface and for each of the plurality of adjacent surfaces; and determining whether a combined coverage and accuracy value of a given adjacent surface is greater than a combined coverage and accuracy value of the selected initial surface by a predetermined threshold.

9. The computer program product of claim 8, wherein selecting the optimal surface further comprises:

responsive to determining the combined coverage and accuracy value of the given adjacent surface is greater than the combined coverage and accuracy value of the selected initial surface by the predetermined threshold, selecting the given adjacent surface as a current selected surface and repeating determining a plurality of adjacent surfaces that differ from the current selected surface by one node and selecting the optimal surface, based on the current selected surface and the plurality of adjacent surfaces, that maximizes accuracy and coverage.

10. The computer program product of claim 8, wherein selecting the optimal surface further comprises:

responsive to determining that there is no given adjacent surface having a combined coverage and accuracy value that is greater than the combined coverage and accuracy value of the selected initial surface, identifying the selected initial surface as the optimal surface.

11. The computer program product of claim 7, wherein the cognitive system classifies data into classes in the hierarchical ontology data structure under control of the classifier model.

12. The computer program product of claim 7, wherein training the classifier comprises evaluating a resulting cognitive model with a testing dataset.

13. An apparatus comprising:

at least one processor; and a memory coupled to the at least one processor, wherein the memory comprises instructions which, when executed by the at least one processor, cause the at least one processor to implement a training system for finding an optimal surface for hierarchical classification task on an ontology, wherein the instructions cause the at least one processor to:

receive, by the training system, a training data set and a hierarchical ontology data structure;

receive, by the training system, a user-specified number of leaf nodes to be covered and a user-specified desired accuracy;

identify, by a surface finding component executing within the training system, a plurality of surfaces that pass through each path from a root to a leaf node in the hierarchical ontology data structure;

select, by the surface finding component, an optimal surface within the plurality of surfaces that covers the user-specified number of leaf nodes and achieves the user-specified desired accuracy;

re-label, by the training system, the training data set using the optimal surface to form a re-labelled training data set; and train, by the training system, a classifier model for a cognitive system on re-labelled training data using the optimal surface and the training data set.

14. The apparatus of claim 13, wherein selecting the optimal surface comprises:

selecting an initial surface that passes through each path from a root to a leaf node in the hierarchical ontology data structure;

determining a plurality of adjacent surfaces within the plurality of surfaces that differ from the selected initial surface by one node;

determining a combined coverage and accuracy value for the selected initial surface and for each of the plurality of adjacent surfaces; and determining whether a combined coverage and accuracy value of a given adjacent surface is greater than a combined coverage and accuracy value of the selected initial surface by a predetermined threshold.

15. The apparatus of claim 14, wherein selecting the optimal surface further comprises:

responsive to determining the combined coverage and accuracy value of the given adjacent surface is greater than the combined coverage and accuracy value of the selected initial surface by the predetermined threshold, selecting the given adjacent surface as a current selected surface and repeating determining a plurality of adjacent surfaces that differ from the current selected surface by one node and selecting the optimal surface, based on the current selected surface and the plurality of adjacent surfaces, that maximizes accuracy and coverage.

16. The apparatus of claim 14, wherein selecting the optimal surface further comprises:

responsive to determining that there is no given adjacent surface having a combined coverage and accuracy value that is greater than the combined coverage and accuracy value of the selected initial surface, identifying the selected initial surface as the optimal surface.

17. The apparatus of claim 13, wherein the cognitive system classifies data into classes in the hierarchical ontology data structure under control of the classifier model.

18. The method of claim 1, wherein re-labelling the training data set comprises for each given input in the training data set and a given label corresponding to the given input, identifying an intersection of the optimal surface and a path from a root node of the hierarchical ontology data structure and the given label.

19. The computer program product of claim 7, wherein re-labelling the training data set comprises for each given input in the training data set and a given label corresponding to the given input, identifying an intersection of the optimal surface and a path from a root node of the hierarchical ontology data structure and the given label.

20. The apparatus of claim 13, wherein re-labelling the training data set comprises for each given input in the training data set and a given label corresponding to the given input, identifying an intersection of the optimal surface and a path from a root node of the hierarchical ontology data structure and the given label.

* * * * *